(12) United States Patent
Leinmueller et al.

(10) Patent No.: US 12,394,304 B2
(45) Date of Patent: Aug. 19, 2025

(54) CPR APR BASED SECURITY FOR ITS (71) Applicant: DENSO CORPORATION, Kariya (JP)

(72) Inventors: Tim Leinmueller, Eching (DE); Prachi Mittal, Eching (DE)

(73) Assignee: DENSO CORPORATION, Kariya (JP)

(*) Notice: Subject to any disclaimer, the term of this patent is extended or adjusted under 35 U.S.C. 154(b) by 208 days.

(21) Appl. No.: 18/364,491

(22) Filed: Aug. 3, 2023

(65) Prior Publication Data
US 2024/0054887 A1 Feb. 15, 2024

(30) Foreign Application Priority Data
Aug. 9, 2022 (EP) .................... 22189500

(51) Int. Cl.
G08G 1/01 (2006.01)
G08G 1/0967 (2006.01)
H04W 4/40 (2018.01)

(52) U.S. Cl.
CPC ..... *G08G 1/0112* (2013.01); *G08G 1/096791* (2013.01); *H04W 4/40* (2018.02)

(58) Field of Classification Search
CPC ..... G08G 1/202; G05D 1/0011; G05D 1/0088
See application file for complete search history.

(56) References Cited

U.S. PATENT DOCUMENTS

| | | | | |
|---|---|---|---|---|
| 2018/0032076 A1* | 2/2018 | Lombrozo | ........ | B60W 60/0017 |
| 2018/0040246 A1* | 2/2018 | Yonemura | ............. | H04W 4/027 |
| 2018/0053141 A1* | 2/2018 | Shydo, Jr. | ............. | G05D 1/104 |
| 2018/0059779 A1* | 3/2018 | Sisbot | .................... | G06T 19/20 |
| 2018/0075538 A1* | 3/2018 | Konrardy | ............... | G08G 1/005 |
| 2018/0082494 A1* | 3/2018 | Rech | ..................... | G05D 1/0088 |
| 2018/0204398 A1* | 7/2018 | Smith | ................... | G07C 5/0808 |
| 2018/0349784 A1* | 12/2018 | Zheng | .................. | G05D 1/2462 |
| 2019/0163176 A1* | 5/2019 | Wang | .................... | G05D 1/0088 |
| 2022/0095115 A1 | 3/2022 | Shimizu et al. | | |

* cited by examiner

*Primary Examiner* — Hussein Elchanti
(74) *Attorney, Agent, or Firm* — Harness, Dickey & Pierce, P.L.C.

(57) ABSTRACT

A method for exchanging of information in an intelligent transport system between a plurality of intelligent transport system stations (ITS-Ss) in said intelligent transport system (ITS) uses a wireless communication channel. The exchanging of information comprises composing, transmitting, receiving and/or decoding at least part of ITS messages at and/or between said plurality of ITS-Ss, wherein each of ITS-Ss comprises at least one sensor arranged to perceive, for example in the form of objects and/or free-space, in at least one geographical area within said traffic environment, is arranged to act both as a sender ITS-S and a receiver ITS-S, and is arranged to use, as said ITS messages, collective perception messages (CPMs) containing at least information about the perception within a traffic environment.

12 Claims, 6 Drawing Sheets

CPR APR BASED SECURITY FOR ITS

CROSS REFERENCE TO RELATED APPLICATIONS

This application claims the benefit of priority from European Patent Application No. EP 22189500.6 filed on Aug. 9, 2022. The entire disclosure of all of the above application is incorporated herein by reference.

TECHNICAL FIELD

The present disclosure relates to information exchange in a cooperative intelligent transport system (C-ITS), and more specifically to a method, a cooperative intelligent transport system and a computer-implemented system of exchanging information between stations in a C-ITS using a wireless communication channel. The information exchange comprises transmitting, receiving, processing and/or discarding a collective perception message (CPM) containing information about on-board sensors and/or objects and/or free-space detected by said on-board sensors within a traffic environment.

BACKGROUND

A known cooperative intelligent transport system (C-ITS) comprises of stations (e.g., vehicles and/or roadside units) that exchange information with each other using (direct) wireless communication, known as vehicle-to-x, or vehicle-to-everything, (V2X) (direct).

V2X is a generic term for traffic networking, electronic communication of road users with each other in the forms of vehicle-to-vehicle (V2V), vehicle-to-infrastructure (V2I), vehicle-to-network (V2N) and vehicle-to-pedestrian (V2P). Wireless communication can be based on the IEEE 802.11 WLAN standard (the 802.11p extension, and e.g., its European profile ITS-G5) and is specifically termed WLAN-V2X. Alternatively, the wireless communication can be based on the 3GPP standards, specifically termed Cellular-V2X, C-V2X, or sidelink. In V2X, for example, safety and traffic messages, emergency and service data, toll billing and navigation as well as Internet and database content are exchanged. The aims of V2V include notifying drivers of critical and dangerous situations at an early stage, improving the vehicles' awareness of their surroundings, supporting the vehicles' driver assistance systems, and supporting cooperative automated mobility, thereby improving traffic safety and optimizing traffic flow.

SUMMARY

According to one aspect of the present disclosure, a method for exchanging of information in an intelligent transport system between a plurality of intelligent transport system stations (ITS-Ss) in said intelligent transport system (ITS) using a wireless communication channel, said exchanging of information comprising composing, transmitting, receiving and/or decoding at least part of ITS messages at and/or between said plurality of ITS-Ss, wherein each of said plurality of intelligent transport system stations (ITS-Ss) comprises at least one sensor arranged to perceive, for example in the form of objects and/or free-space, in at least one geographical area within said traffic environment, is arranged to act both as a sender ITS-S and a receiver ITS-S, and is arranged to use, as said ITS messages, collective perception messages (CPMs) containing at least information about the perception within a traffic environment, and wherein an ITS communications security architecture including at least one security layer as a horizontal security management entity in the ITS communication stack is configured to provide security services to ITS station communications. The method comprises the steps of: obtaining an information and misbehavior verification related requirement from the at least one security layer; composing an area perception request (APR) based on said information and misbehavior verification related requirement; sending, from an ITS-S acting as a sender ITS-S, the APR composed based on said information and misbehavior verification related requirement, and requesting perception information from another ITS-S capable of perceiving with respect to said information and misbehavior verification related requirement; receiving, from said another ITS-S, the requested perception information in a subsequent CPM of said another ITS-S; and verifying information sent by other ITS-Ss or verifying misbehavior based on the perception information received from said another ITS_S.

DESCRIPTION OF EMBODIMENTS

To begin with, a relevant technology will described first only for understanding the following embodiments.

The ITS stations (ITS-Ss) in the C-ITS share CAMs (Cooperative Awareness Messages) to inform each other about their own position, kinematics, and other data. The ITS-Ss use DENMs (Decentralized Environmental Notification Messages) to inform each other on dedicated events, such as hard braking or obstacles on the road.

Figure 1:
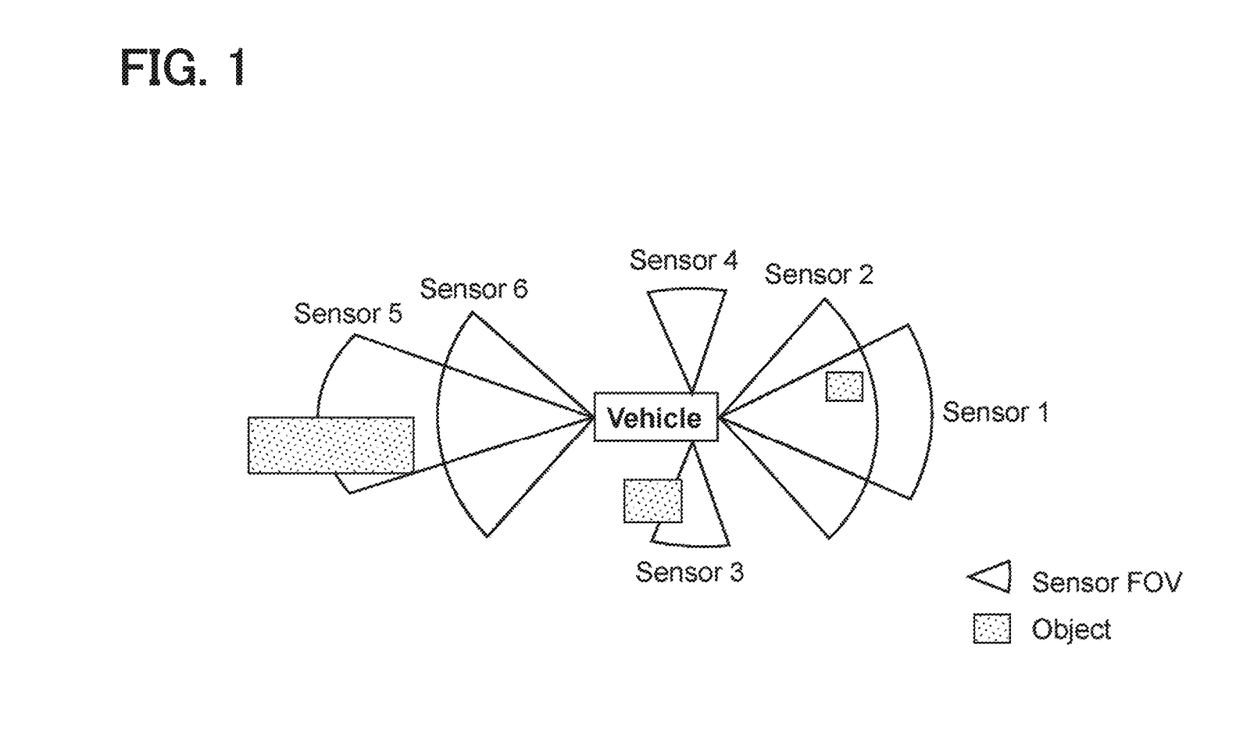
FIG. 1 illustrates an exemplary vehicle setup in which a vehicle is equipped with sensors each having a predetermined field-of-view and exemplary objects are located in the vicinity of the vehicle.

Another V2X message is the Collective Perception Message (CPM) that contains information about on-board sensors, such as field-of-views (FOVs), free-space, and the objects detected within the traffic environment by the on-board sensors of an ITS-S. FIG. 1 shows an example of a vehicle setup comprising a vehicle with sensors 1 to 6 each having a predetermined field-of-view. Exemplary objects are illustrated in the vicinity of the vehicle.

Figure 2A:
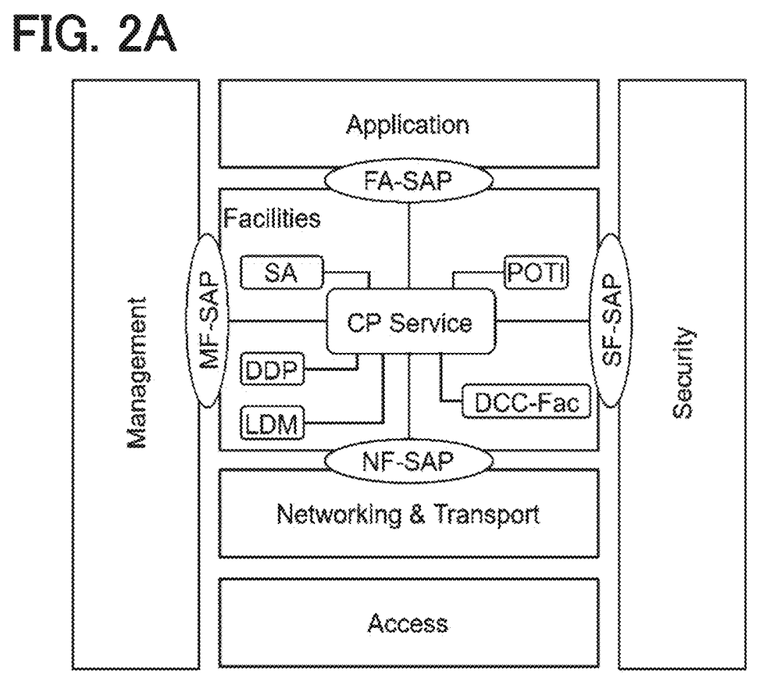
FIGS. 2A and 2B illustrate the ETSI ITS-Stack and CPS in a CPS-centric view and a TX/send and RX/receive information flow through service layers and a security entity in an ITS-S.
Figure 3:
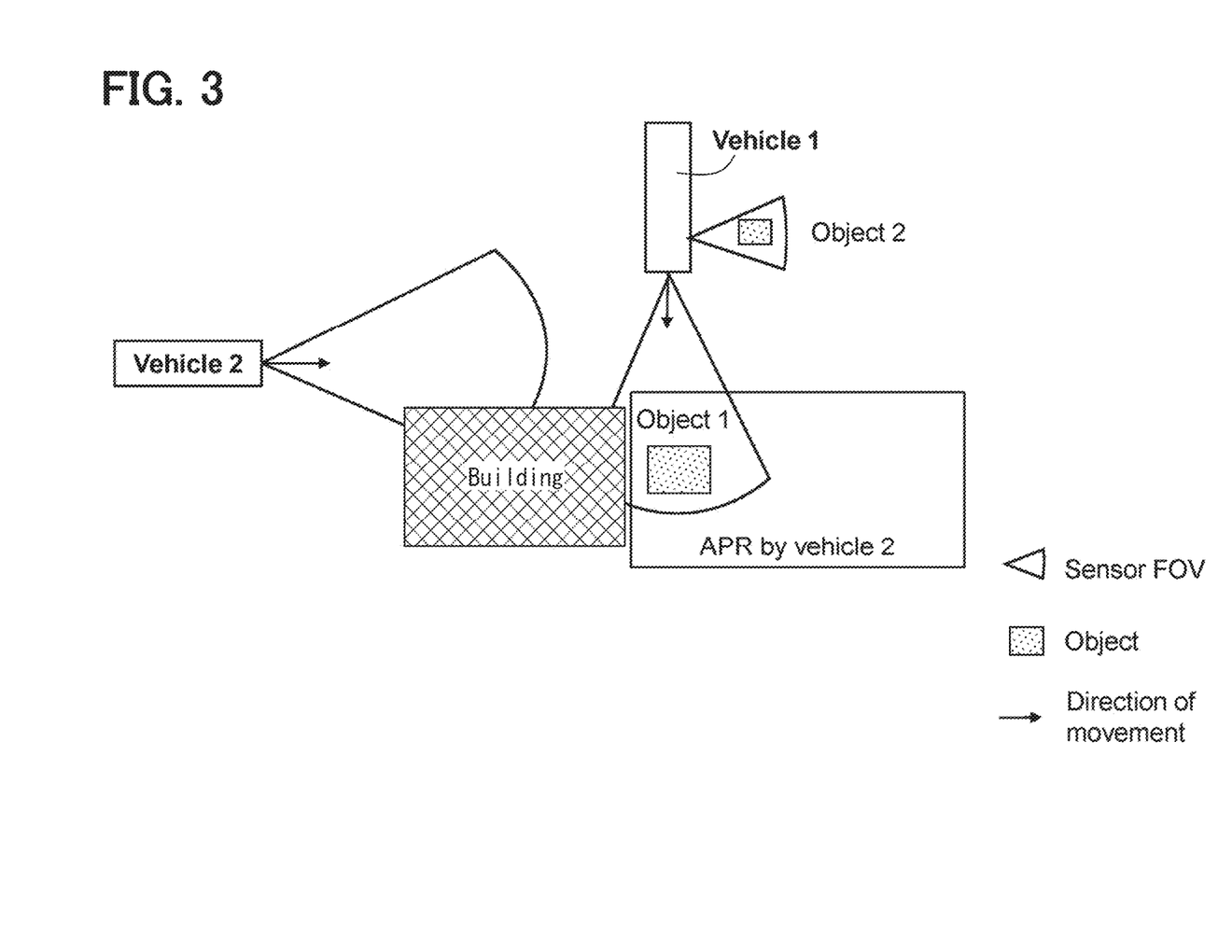
FIG. 3 illustrates another exemplary vehicle setup in the embodiment where a vehicle makes an Area Perception Request (APR) for an area occluded by a building and another vehicle correspondingly includes an occluded object in its next CPM.

CPMs are sent out periodically and contain information on one or more detected objects and/or freespace, field-of-views and other characteristics of vehicle on-board sensors such as e.g., a radar, a camera and the like. CPMs are composed by the Collective Perception Service (CPS)

within the facility layer of the ETSI ITS stack, as shown in FIG. 2A illustrating the ETSI ITS-Stack and CPS in a CPS-centric view. The current functions of CPS are illustrated in FIG. 3 and will be further referred to in connection with FIG. 4 below.

In C-ITS, a concept of Decentralized Congestion Control (DCC) is employed to handle a congested channel. DCC operates at all layers of the ETSI ITS stack.

In addition, a concept of an area perception request (APR) meanwhile proposes to include, within a CPM or in a modification alternatively as a message separate from a CPM, i.e. not as part of a CPM, a request for perception information in a geographical area for which a sender ITS-S has little or no perception information. An ITS-S may have little or no perception information because the environment perception by an ITS-S has perception "blind-spots", i.e. areas where the ITS-S is able to perceive poorly or not at all, e.g. due to occlusion by objects, limitation in the capabilities of the sensors installed on the ITS-S, weather conditions and the like. These perception "blind-spots" can cause safety hazards in the traffic environment. A limited approach in the concept of CPM addresses this by allowing the ITS-Ss to send their perceived objects/free-space to others, and the APR concept improves thereon by resolving the CPM limitation in that an ITS-S cannot request perceived objects and/or free-space information for the blind-spot of this ITS-S.

Within their messages, ITS-Ss can misbehave by sending, maybe even maliciously, false and/or outdated information. For example, ITS-S misbehavior can reside in falsification of the own position (within CAM and CPM), which would result in sending wrong information about detected objects (within CPM).

While misbehavior detection and reporting in a so called MRS (Misbehavior Reporting System) is on-going work in standardization (cf. e.g. ETSI TS 103 759), MRS and other security related functions within an ITS-S are carried out in the security layer of the ITS architecture (cf. FIG. 2A). The concept of the ITS communications security architecture is described in further detail in e.g. ETSI TS 102 940 V1.2.1 (2016 November) and ETSI TS 102 723-9 V1.1.1 (2021 March), which are incorporated herein by reference.

It should be noted that FIG. 2A shows Security, also called a security entity as used hereinafter, as a vertical layer adjacent to each of the ITS layers but, security services are provided on a layer-by-layer basis so that the security layer can be considered to be subdivided into the four basic ITS processing layers (Application, Facilities, Networking & Transport, Access) as shown in FIG. 2. The vertical Security layer can be understood as being represented by Security Services and Security Management layers, and Security services are provided on a layer-by-layer basis, in the manner that each of the security services operates within one or several ITS architectural layers, or within the Security Management layer.

Figure 2B:
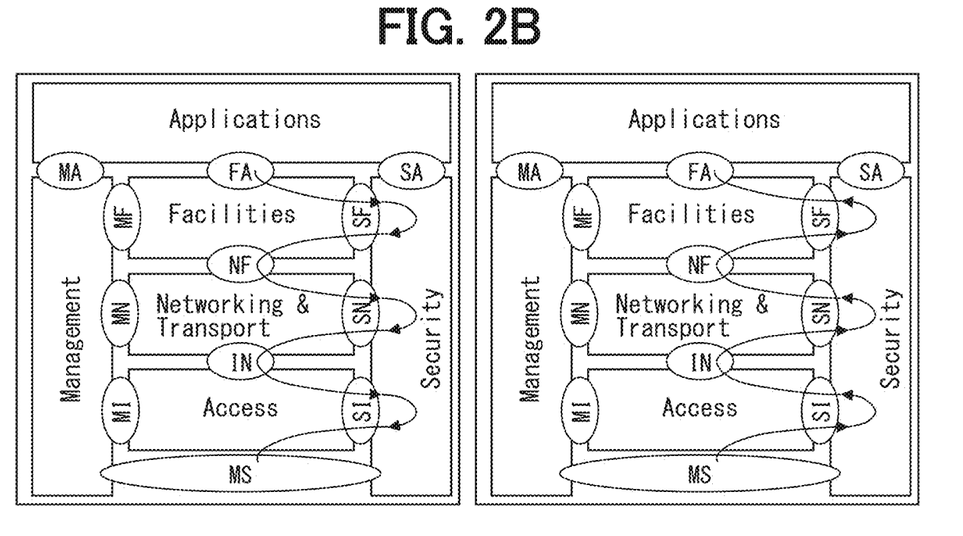

As shown in FIG. 2B, interaction between the security entity and the layers may follow two principles. First, the vertical message flow through the layers from top to bottom or vice versa. Secondly, the horizontal control communication from the security entity towards the corresponding layer. More specifically, there is a horizontal control communication between the security entity and the corresponding communications layer via Service Access Points (SAP), e.g. SF-SAP for security entity to facilities layer, SN-SAP for security entity to networking & transport layer, SI-SAP for security entity to access layer, among others.

Detecting and verifying misbehavior is not always easy in a C-ITS, especially when there is no additional data to cross-check suspicious data received from an ITS-S.

A general approach for detecting and verifying misbehavior may be based on ITS-Ss exchanging information between each other and being capable of warning or even preparing for a dangerous situation. If the ITS-S are, for example and without being limited thereto, vehicles in a VANET (Vehicular Ad-Hoc Network), the vehicles may exchange information between each other and can warn drivers or even prepare for a dangerous situation, for example engage pre-crash functionalities like airbag preloading. The decision how to react on information received from other vehicles must be made locally, and for system security, i.e. for preventing misuse or distortion, each vehicle must evaluate its surrounding independently. A framework for behavior analysis modules is configured to evaluate neighboring vehicles regarding trustworthiness. For example, the output of multiple behavior analysis modules may be combined and each vehicle may be assigned a trustworthiness value which may be additionally exchanged among all vehicles, building up reputation. Based on this information, vehicles may be classified into trustworthy, untrustworthy or neutral. This classification may then be taken into consideration to appropriately respond to incoming information and used to detect misbehavior, especially intentional misbehavior.

In the context of a configuration as described above, which is further independent from applications and in which the analyzed data is movement-related data, i.e. kinematics data, ETSI standards currently list mechanisms to detect misbehavior based on vehicle kinematics data sent in CAM.

For example, CAM generation frequency rules as currently specified in ETSI are allowed to vary between 100 ms and 1 000 ms, corresponding to a transmission rate between 1 Hz and 10 Hz. The CAM transmission frequency is varying, for instance depending on the channel usage requirements of DCC for ITS-G5 channels, and on the vehicle kinematics. A new CAM is, for example, generated once one of the following conditions is satisfied since the previously sent CAM: (a) the vehicle orientation (heading) has changed by more than a predetermined amount, e.g. 4 degrees; (b) the position of the vehicle has changed by more than a predetermined amount, e.g. 4 m; (c) the vehicle speed has varied by more than a predetermined amount, e.g. 0.5 m/s (1.8 Km/h). The previous verifications are done every 100 ms. As an example, a vehicle traveling at a speed higher than 180 km/h would send 10 CAMs per second (it will have moved more than 5 m at each check). Similarly, a vehicle traveling in a straight line at 50 km/h will send just under 2 CAMs per second, and at 90 km/h, it will send 5 CAMs per second.

As for message content verification, plausibility checks may try to categorize CAMs as suspicious by checking the physical implausibility of kinematics, or mobility, data in received messages such as position, heading, speed, acceleration. Misbehavior detection based on vehicle kinematics data sent in CAM is, accordingly, limited to misbehavior related to only falsification of kinematics data.

It is one of objectives of the present disclosure to provide, in a traffic environment, mechanisms to detect misbehavior of an ITS-S responding to an area perception request and sending bad data for detected objects within a CPM.

An underlying idea of the present disclosure resides in providing, as an addition to existing concepts and standards, a security related logical module "CPS_SEC" allocated to or split between security and facility layers in a C-ITS.

CPS_SEC is configured to support other functional entities in different layers of the ITS stack, e.g. the MRS in the security layer, in verifying various pieces of information received from other ITS-Ss. The verification is carried out by strategically sending out APRs (Area Perception Requests) within outgoing CPMs or, alternatively, in messages separate from CPMs (for example, an area where the sender ITS-S already has perception information is be used to verify the claims of another ITS-S who is "supposedly" able to perceive in this area) and used to assess the position claims by other ITS-Ss for self or objects detected by their sensors. Here, "strategically" shall be understood to mean "not just sending any APRs but APRs tailored to verify specific elements of other received information". Optionally trying to "hide" that one is using APRs to verify information (e.g. by sending not just one APR).

Using the concept of sensor information sharing of CPM for allowing the ITS-Ss to crowdsource perception information for a specific area by sending an Area Perception Request (APR) corresponding to an area (geographical area) for which they want to receive perception information, CPS_SEC is configured to request APRs and to use them to verify a previously detected (potential) misbehavior by another ITS-S. For example, once received CPMs including APRs are decoded in CPM decoding, information related to specific APRs is provided to CPS_SEC. This verification may also be carried out by strategically sending out APRs in outgoing CPMs, triggered by CPS_SEC. It may be preferable to send the APR as an optional container within a CPM or, alternatively, in a message separate from CPM. For a non-limiting example, an APR area of interest parameter may be of a format the same or similar to 'Geographic area' as mentioned in e.g. the ETSI EN 302 931 documentation.

The underlying idea and concept as above preferably includes position verification for detected objects, where a host ITS-S is configured to send out an APR for the geographic area around the object position claimed by a suspect remote ITS-S and to confirm the position claim by receiving object information within this area from trusted third party ITS-Ss being in a position to respond to that APR.

The underlying idea and concept as above preferably includes misbehavior verification, where a host ITS-S is configured to send out an APR for an area strategically calculated to confirm a misbehavior in question, wherein if a remote ITS-S is suspected of sending a false own position, the suspected false own position is verified by sending an APR around the claimed position and comparing object data received in response from trusted third party ITS-Ss being in a position to respond to that APR to the object data sent by the suspected node, and/or if a remote ITS-S is suspected of sending one or more false objects, the one or more suspected false objects are verified by sending an APR around one of the claimed object position and comparing object data received in response from trusted third party ITS-Ss being in a position to respond to that APR to the object data sent by the suspected node.

Preferably, the evaluation of information of received CPMs takes into account the number of received feedbacks, a trustworthiness level of the source of the information, as well as margins compensating for inaccuracies of detection. Further preferably, verification results are combined with information from a misbehavior detection sensor, which may e.g. be a dedicated one of the ITSs sensors. If the verification results are or remain inconclusive, i.e. undetermined with respect to the presence or absence of misbehavior, follow up APRs can be used at a later time, e.g. when new ITS-Ss have joined the area in question.

In the above context, the concept as discussed includes, with regard to a sending ITS-S, steps and unit for determining how to compose an APR, such as assessing own perception blind spots by determining unperceived or poorly perceived areas in a circle of a certain radius (e.g., 200 meters at 50 km/h) and/or of a limited size (e.g., 100 $m^2$) around a vehicle, selecting a most relevant of these blindspots to be sent in the APRs, with a relevance being based on e.g. upcoming driving tasks, such as driving straight ahead, driving into an intersection, changing lane, or the proximity to the perception blind-spot, and including an APR within a CPM, e.g. within the next CPM to be sent out. A configuration may be such that a predetermined number of APRs, e.g. 16 APRs, in a CPM at one time is not exceeded. A configuration may be such that an APR is repeated as long as it is determined to be relevant. It is noted that the inventive concept of an APR is not limited to including it within a CPM. Sending out the APR as a separate message and not part of CPM is conceivable in a modification of the present disclosure.

Within the above idea and concept, the use of received APRs by one or more receiving ITS-Ss may be configured to include perceived objects/free-space information for the requested area(s) in the next CPM, and to trigger or cause an amendment or update of an object significance index (O-SI) such as an increase of the O-SI of an object based on a number of APRs corresponding to that object.

According to a first aspect of the present disclosure, a method for exchanging of information in an intelligent transport system between a plurality of intelligent transport system stations (ITS-Ss) in said intelligent transport system (ITS) using a wireless communication channel, said exchanging of information comprising composing, transmitting, receiving and/or decoding at least part of ITS messages at and/or between said plurality of ITS-Ss, wherein each of said plurality of intelligent transport system stations (ITS-Ss) comprises at least one sensor arranged to perceive, for example in the form of objects and/or free-space, in at least one geographical area within said traffic environment, is arranged to act both as a sender ITS-S and a receiver ITS-S, and is arranged to use, as said ITS messages, collective perception messages (CPMs) containing at least information about the perception within a traffic environment, and wherein an ITS communications security architecture including at least one security layer as a horizontal security management entity in the ITS communication stack is configured to provide security services to ITS station communications. The method comprises the steps of: obtaining an information and misbehavior verification related requirement from the at least one security layer; composing an area perception request (APR) based on said information and misbehavior verification related requirement; sending, from an ITS-S acting as a sender ITS-S, the APR composed based on said information and misbehavior verification related requirement, and requesting perception information from another ITS-S capable of perceiving with respect to said information and misbehavior verification related requirement; receiving, from said another ITS-S, the requested perception information in a subsequent CPM of said another ITS-S; and verifying information sent by other ITS-Ss or verifying misbehavior based on the perception information received from said another ITS_S.

According to a second aspect of the present disclosure, said information and misbehavior verification related requirement is a requirement directed to detect and/or verify an ITS-S sending false and/or outdated information, and/or an ITS-S falsifying its own position.

According to a third aspect of the present disclosure, misbehavior detection and reporting is carried out in a misbehavior reporting system (MRS) carried out in the security layer of the ITS architecture.

According to a fourth aspect of the present disclosure the security layer is subdivided into at least four basic ITS architecture layers, wherein security services are provided on a layer-by-layer basis, and wherein each of the security services operates within one or several of said ITS architectural layers.

According to a fifth aspect of the present disclosure, a security related logical module (CPS_SEC) is provided and allocated to or split between security and facility layers in a cooperative intelligent transport system (C-ITS), and wherein CPS_SEC is configured to request APRs and to use them to verify a previously detected misbehavior by another ITS-S.

According to a sixth aspect of the present disclosure, CPS_SEC is configured to support other functional entities in different layers of the ITS stack in verifying various pieces of information received from other ITS-Ss, wherein verification is carried out by strategically sending out APRs within outgoing CPMs and used to assess the position claims by other ITS-Ss for self or objects detected by their sensors.

According to a seventh aspect of the present disclosure, the method includes a step of position verification for detected objects where a host ITS-S is configured to send out an APR for the geographic area around the object position claimed by a suspect remote ITS-S and to confirm the position claim by receiving object information within this area from trusted third party ITS-Ss being in a position to respond to that APR.

According to an eighth aspect of the present disclosure, the method includes a step of misbehavior verification where a host ITS-S is configured to send out an APR for an area strategically calculated to confirm a misbehavior in question, wherein if a remote ITS-S is suspected of sending a false own position, the suspected false own position is verified by sending an APR around the claimed position and comparing object data received in response from trusted third party ITS-Ss being in a position to respond to that APR to the object data sent by the suspected node, and/or if a remote ITS-S is suspected of sending one or more false objects, the one or more suspected false objects are verified by sending an APR around one of the claimed object position and comparing object data received in response from trusted third party ITS-Ss being in a position to respond to that APR to the object data sent by the suspected node.

According to a ninth aspect of the present disclosure, evaluation of information of received CPMs takes into account the number of received feedbacks, a trustworthiness level of the source of the information, as well as margins compensating for inaccuracies of detection.

According to a tenth aspect of the present disclosure, verification results are combined with a misbehavior detection sensor, and wherein follow-up APRs are used at a later time if the results are inconclusive.

According to an eleventh aspect of the present disclosure, an intelligent transport system for exchanging of information in an intelligent transport system between a plurality of intelligent transport system stations (ITS-Ss) in said intelligent transport system (ITS) using a wireless communication channel, said exchanging of information comprising composing, transmitting, receiving and/or decoding at least part of ITS messages at and/or between said plurality of ITS-Ss, wherein each of said plurality of intelligent transport system stations (ITS-Ss) comprises at least one sensor arranged to perceive, for example in the form of objects and/or free-space, in at least one geographical area within said traffic environment, is arranged to act both as a sender ITS-S and a receiver ITS-S, and is arranged to use, as said ITS messages, collective perception messages (CPMs) containing at least information about the perception within a traffic environment, and wherein an ITS communications security architecture including at least one security layer is configured to provide security services to ITS station communications. The intelligent transport system comprises: an obtaining unit arranged to obtain an information and misbehavior verification related requirement from the at least one security layer; a composing unit arranged to compose an area perception request (APR) based on said information and misbehavior verification related requirement; a sending unit arranged to send, from an ITS-S acting as a sender ITS-S, the APR composed based on said information and misbehavior verification related requirement, and requesting perception information from another ITS-S capable of perceiving with respect to said information and misbehavior verification related requirement; a receiving unit arranged to receive, from said another ITS-S, the requested perception information in a subsequent CPM of said another ITS-S; and a verifying unit arranged to verify information sent by other ITS-Ss or verifying misbehavior based on the perception information received from said another ITS_S.

According to a twelfth aspect of the present disclosure, a computer-implemented system for exchanging of information in an intelligent transport system between a plurality of intelligent transport system stations (ITS-Ss) in said intelligent transport system (ITS) using a wireless communication channel, said exchanging of information comprising composing, transmitting, receiving and/or decoding at least part of ITS messages at and/or between said plurality of ITS-Ss, wherein each of said plurality of intelligent transport system stations (ITS-Ss) comprises at least one sensor arranged to perceive, for example in the form of objects and/or free-space, in at least one geographical area within said traffic environment, is arranged to act both as a sender ITS-S and a receiver ITS-S, and is arranged to use, as said ITS messages, collective perception messages (CPMs) containing perception information within a traffic environment, and wherein an ITS communications security architecture including at least one security layer is configured to provide security services to ITS station communications. The computer-implemented system comprises a memory for storing instructions which, when carried out by a processor, cause the processor to perform the steps of: obtaining an information and misbehavior verification related requirement from the at least one security layer; composing an area perception request (APR) based on said information and misbehavior verification related requirement; sending, from an ITS-S acting as a sender ITS-S, the APR composed based on said information and misbehavior verification related requirement, and requesting perception information from another ITS-S capable of perceiving with respect to said information and misbehavior verification related requirement; receiving, from said another ITS-S, the requested perception information in a subsequent CPM of said another ITS-S; and verifying information sent by other ITS-Ss or verifying misbehavior based on the perception information received from said another ITS_S.

It is understood that the above second to tenth aspects are likewise and correspondingly applicable to the systems according to the eleventh and twelfth aspects of the present disclosure.

The present disclosure is designed to advantageously provide for a consideration of additional parameters (e.g. detection confidence, location discrepancy etc.) for significance determination, a consideration of any type of objects (not just e.g. VRUs), a consideration of any type of ITS-S (not just e.g. vehicles), a consideration of Area perception Requests (APR), a transmission of the significance parameter itself, a selective aggregation of objects (as opposed to single message per object, or aggregation of all detected objects in one message), and a consideration of a specific V2X message (CPM).

As further understood, in the above context and without being limited thereto, ITS-Ss at least comprise vehicles and/or roadside units in the traffic environment the aforementioned aspects are applicable to.

Hereinafter, various embodiments of the present disclosure will be described with reference to the drawings. Note that the same reference numerals are given to corresponding components in each embodiment, and redundant description may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

As mentioned at the outset, V2X is a generic term for traffic networking, electronic communication of road users with each other in the forms of vehicle-to-vehicle (V2V), vehicle-to-infrastructure (V2I), vehicle-to-network (V2N) and vehicle-to-pedestrian (V2P). Wireless communication can be based on the IEEE 802.11 WLAN standard (the 802.11p extension, and e.g., its European profile ITS-G5) and is specifically termed WLAN-V2X. Alternatively, the wireless communication can be based on the 3GPP standards, specifically termed Cellular-V2X, C-V2X, or sidelink. In V2X, for example, safety and traffic messages, emergency and service data, toll billing and navigation as well as Internet and database content are exchanged. The aims of V2V include notifying drivers of critical and dangerous situations at an early stage, improving the vehicles' awareness of their surroundings, supporting the vehicles' driver assistance systems, and supporting cooperative automated mobility, thereby improving traffic safety and optimizing traffic flow.

Two alternative access layer technologies for ITS have been defined by the Institute of Electrical and Electronics Engineers (IEEE) and the Third Generation Partnership Project (3GPP), respectively.

The first approach is often referred to as Dedicated Short-Range Communication (DSRC), which supports vehicular ad-hoc connectivity using Wireless Local Area Network (WLAN) technologies standardized as IEEE 802.11p, which is the basis for the European standard ETSI ITS-G5. The second approach is Cellular-based V2X (C-V2X), a proposal by the 3GPP, based on Long-Term Evolution (LTE), also known as LTE-V2X or sidelink.

In this context, cooperative awareness within road traffic unit that road users and roadside infrastructure are informed about each other's position, dynamics and attributes. Road users are all kind of users on or near the road that play a role in traffic safety and control, such as cars, trucks, motorcycles, bicycles or even pedestrians and roadside infrastructure equipment including road signs, traffic lights or barriers and gates. The awareness of each other is the basis for several road safety and traffic efficiency applications with many use cases as described in ETSI TR 102 638. It is achieved by regular broadcasting of information among the road users, from vehicle to vehicle (V2V), but also from infrastructure to any road user, V2I, I2V or X2X based on wireless networks, called V2X network and as such is part of Intelligent Transport Systems (ITS).

Cooperative safety and traffic efficiency applications require Intelligent Transportation System (ITS) sub-systems (road users, roadside units, etc.) and their ITS-Stations (ITS-Ss) to develop situational awareness that includes the presence and behavior of road users in their vicinity. Vehicle sub-systems and roadside sub-systems develop their situational awareness from their perception sensors and through communication with other surrounding ITS-Ss. The CA basic service EN 302 637-2, is a European Norm (EN) that specifies how an ITS-S can inform others about its associated sub-systems position, dynamics and attributes by sending Cooperative Awareness Messages (CAMs) according to EN 302 637-2.

The Collective Perception service (CP service or CPS) complements the CA basic service. The CPS specification defines how an ITS-S can inform others about the position, dynamics and attributes of neighboring road users, other objects, and free-space detected by local perception sensors. The CPS enables ITS sub-systems to share information about other road users and obstacles that were detected by local perception sensors such as radars, cameras and the like. In that sense, it aims at increasing awareness between ITS sub-systems by mutually contributing information about their perceived objects to the individual knowledge base of the sub-system.

The Collective Perception Message (CPM) enables sharing of information about detected objects by the disseminating ITS sub-system. The message consists of information about the disseminating ITS sub-system, its sensory capabilities and its detected objects. For this purpose, the message provides generic data elements to describe detected objects in the reference frame of the disseminating ITS sub-system. The CPM is transmitted cyclically with adaptive message generation rates to decrease the resulting channel load while focusing on reporting changes in the dynamic road environment.

In particular, draft ETSI Technical Specification ETSI TS 103 324, currently in the form of V0.0.22 draft (2021-05), focuses on the specifications of CPMs transmitted by ITS-Ss participating in the V2X network and the specification of the CPS with trigger conditions for sending CPMs.

As used herein, an object in the context of the CPS is defined as the state space representation of a physically detected object within a sensor's perception range, an object list is defined as a collection of objects temporally aligned to the same timestamp, the Collective Perception (CP) Service is defined as a facility at the ITS-S facilities layer to generate, receive and process CPMs, the Collective Perception Message (CPM) is defined as a CP service PDU (Protocol Data Unit), Collective Perception Message (CPM) data is defined as a partial or complete CPM payload, the Collective Perception (CPM) protocol is defined as the ITS facilities layer protocol for the operation of the CPM transmission and reception, an ITS station is defined as a functional entity specified by the ITS station (ITS-S) reference architecture, an Object confidence is defined as a quantification of the confidence that a detected object actually exists, i.e., has been detected previously and has continuously been detected by a sensor, a Roadside ITS station is defined as an ITS station in a roadside ITS sub-system, a Sensor Measurement is defined as the operation of a sensor based on its working principle to generate a state space representation for detected objects, a State Space Representation is defined as the mathematical description of a detected object consisting of state variables such as distance, speed, object dimensions, etc., and a Vehicle ITS station is defined as an ITS station in a vehicular ITS sub-system. CPU(s) in an ITS-S carry out the respective layer functions, namely application layer, facilities layer, and network and transport layer.

FIG. 2A depicts in more detail the Collective Perception (CP) service within the ITS-S architecture along with the logical interfaces to other layers and entities within the Facilities layer. The CPS is a Facilities layer entity in the ITS-S-S architecture. It interfaces with other entities of the Facilities layer and with ITS applications to collect relevant information for CPM generation and for forwarding received CPM content for further processing.

The entities for the collection of data to generate a CPM are the Device Data Provider (DDP), the Position and Time management (POTI) and the Local Dynamic Map (LDM). For vehicle ITS sub-systems, the DDP is connected with the in-vehicle network and provides the vehicle state information. For roadside ITS sub-systems, the DDP is connected to sensors mounted on the roadside infrastructure such as poles or gantries. The POTI entity provides the position of the ITS-S and time information. The LDM is a database in the ITS-S, which in addition to on-board sensor data is configured to be updated with received data from message such as CAM and CPM. ITS applications retrieve information from the LDM for further processing. The CPS also interfaces with the Service Announcement (SA) Service to indicate an ITS-S's ability to generate CPMs and to provide details about the communication technology/ies used.

Message dissemination-specific information related to the current channel utilization are received by interfacing with the DCC-FAC (Decentralized Congestion Control for Facility Layer) entity and the DCC-Cross entity (located in the Management plane, not shown in FIG. 2). The CPS interfaces through the NF-SAP (SAP for Networking-Facility layer interface) with the networking & transport layer (N&T) for exchanging of CPMs with other ITS-Ss, the SF-SAP (SAP for Security-Facility layer interface) with the Security entity to access security services for CPM transmission and CPM reception, the MF-SAP (SAP for Management-Facility layer interface) with the Management entity and the FA-SAP (SAP for Facility-Application layer interface) with the application layer if received CPM data is provided directly to the applications. It is noted that SAP stands for Service Access Point, and that SA stands for Service Announcement.

FIG. 3 illustrates another exemplary vehicle setup in the embodiment where a vehicle makes an Area Perception Request (APR) for an area occluded by a building and another vehicle correspondingly includes an occluded object in its next CPM. Within the context of CPS functions, which in a respective ITS-S encompass CPM transmission management, CPM reception management, CPM encoding and CPM decoding based on input from the DCC (including e.g. information about available channel resources), from on-board sensors (including e.g. information about sensor characteristics, FOVs, objects, free-space), CAMs and CPMs (from outside the respective ITS-S, e.g. from one or more other ITS-Ss), the existing CPS functions are expanded and/or adapted by incorporating a concept of sensor information sharing of CPM for allowing the ITS-Ss to crowd-source perception information for a specific area by an ITS-S sending an Area Perception Request (APR) corresponding to an area for which it wants to receive perception information.

Figure 4:
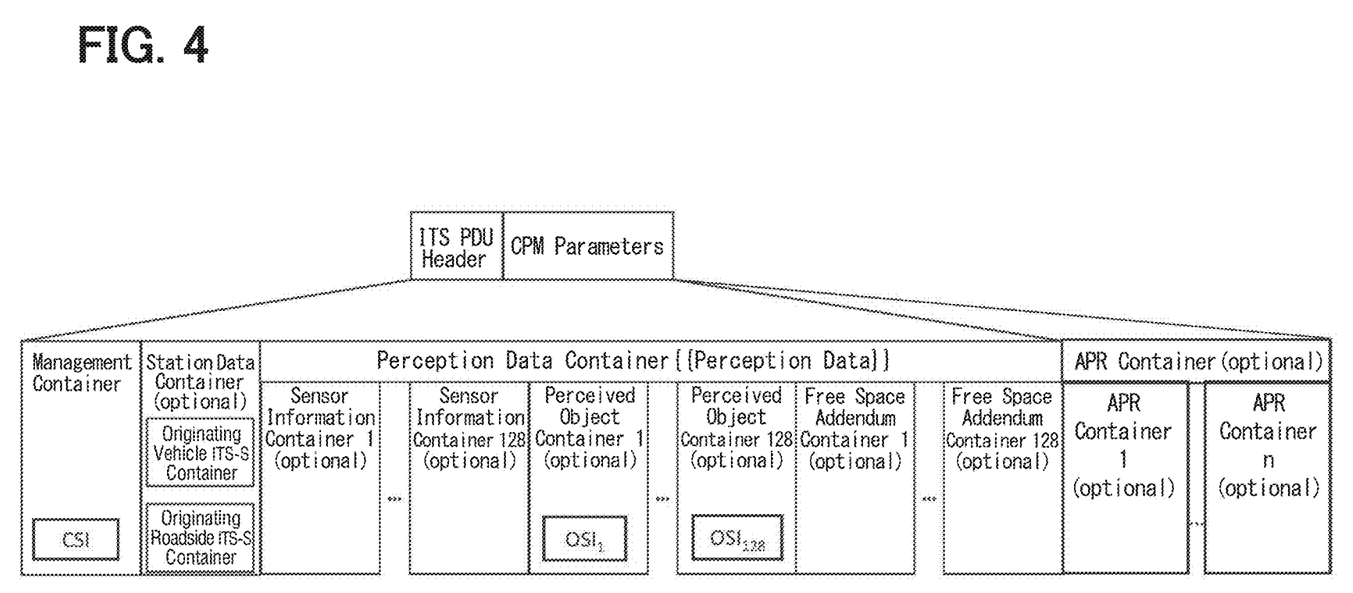
FIG. 4 depicts, in a general overview, where additions according to the embodiment may suitably weave into the current ETSI CPM format.

The APR is preferably sent as an optional container within a CPM, as shown in FIG. 4 referred to below. An APR area of interest parameter may have a same or similar format as 'geographic area' mentioned in document ETSI EN 302 931.

With respect to the need of other ITS-Ss, a number of area perception requests (APRs) by other ITS-Ss of an area in which an object detected by a host ITS-S is located, are preferably taken into account. Here, as non-limiting examples, the request for this area may be explicitly sent out by a neighboring ITS-S, and/or the request may be part of an optional container within the CPM where the sending ITS-S can indicate the area for which it would like to receive object information.

As shown in the exemplary vehicle setup in FIG. 3, in a traffic environment including a first and a second vehicle, a first and a second object and e.g., a building, the first object (Object 1) is deemed more significant than the second object (Object 2) by the first vehicle (Vehicle 1) because the first object falls in an area perception request (APR) area of the second vehicle (Vehicle 2). For example, in FIG. 3, the second vehicle (Vehicle 2) makes an Area Perception Request (APR) for the area occluded by a building and the first vehicle (Vehicle 1) correspondingly includes object 1 in its next CPM.

FIG. 4 illustrates a current state of the ETSI CPM format and identifies where the present disclosure might weave into this format. Current ETSI developments to specify the CPS service are described in a Technical Report describing the CPM format and the CPM generation rules as a baseline for the specification of CPS in ETSI TS 103 324.

As shown in FIG. 4, CPM messages include an ITS (Intelligent Transport Systems) PDU (Protocol Data Unit) header and 4 types of containers: A Management Container, a Station Data Container, a plurality of Sensor Information Containers (SICs) and a plurality of Perceived Object Containers (POCs).

The ITS PDU header includes data elements like a protocol version, a message ID and a Station ID. The Management Container is mandatory and provides basic information about a transmitting vehicle (such as the position thereof). Position information is used by a receiver to reference detected objects. The Station Data Container is optional and includes additional information about the transmitting vehicle (e.g., its speed, heading, or acceleration). In addition, a CPM can include up to 128 SICs to describe the capabilities of sensors embedded in the transmitting vehicle. Finally, the POCs provide information about detected objects (e.g., a distance between the detected object and the transmitting vehicle), a speed and dimensions of an object, and the time at which these measurements were done. A single CPM can include up to 128 POCs.

The CPM generation rules define when a vehicle should generate and transmit a CPM and the information to be included in the CPM. Current ETSI CPM generation rules establish that a vehicle has to check in predetermined intervals if a new CPM should be generated and transmitted. By default, the predetermined interval is set to 100 ms although it can be any multiple of 100 ms in the range between 100 ms and 1000 ms. For every predetermined interval, a vehicle should generate a new CPM if it has detected a new object, or if its absolute position has changed by more than a predetermined amount, e.g. 4 m, since the last time its data was included in a CPM, or if its absolute speed has changed by more than a predetermined value, e.g. 0.5 m/s, since the last time its data was included in a CPM, or if the last time the detected object was included in a CPM was a predetermined period of time, e.g. 1 (or more) seconds, ago. A vehicle includes in a new CPM all new detected objects and those objects that satisfy at least one of the previous conditions. The vehicle still generates a CPM every second even if none of the detected objects satisfy any of the previous conditions. The information about the onboard sensors is included in the CPM only once per second.

According to FIG. 4, as further shown, the present disclosure might weave into the pending ETSI CPM format at APR containers 1 to 16, cf. the right-hand side of FIG. 4, as for example an addition of CPS_SEC functionality within the APR container inclusion management (e.g. as defined in ETSI TS 103 324, section 6.1.3.x), or as an addition of misbehavior related information exchange at the interface between CPS and the security layer (e.g. as defined in ETSI TS 103 324, section 5.3.6). Further, specifics of the proposed solution according to the present disclosure might weave into misbehavior detection based on CPM (e.g. as defined in ETSO TS 103 759, section 6.3).

Figure 5:
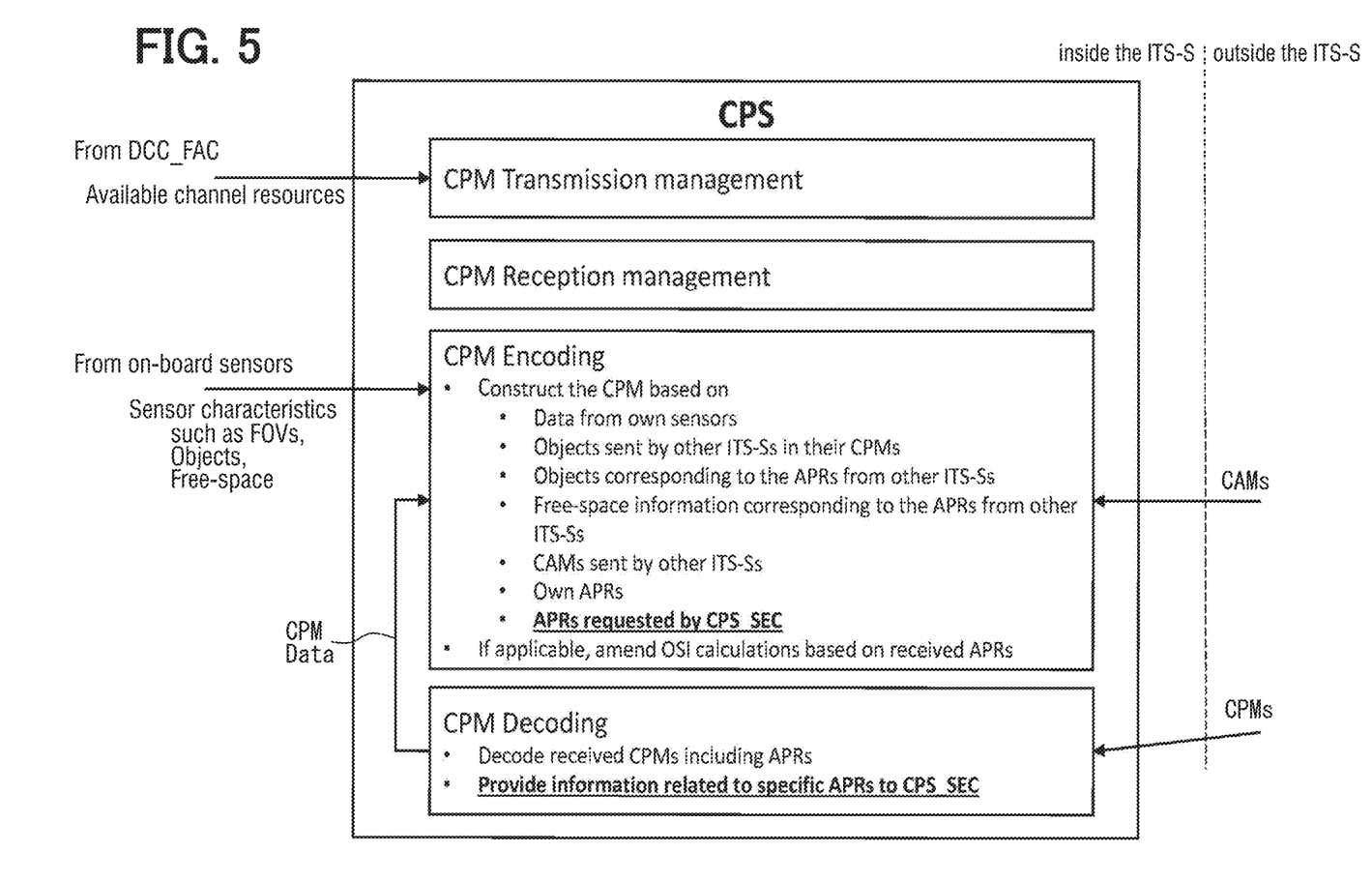
FIG. 5 illustrates CPS functions and changes to CPS functions according to an embodiment.

FIG. 5 illustrates CPS functions and changes to CPS functions according to the embodiments herein. The changes related to the concept of CPS_SEC are marked underlined in FIG. 5 and will be referred to in greater detail hereinbelow.

Figure 6:
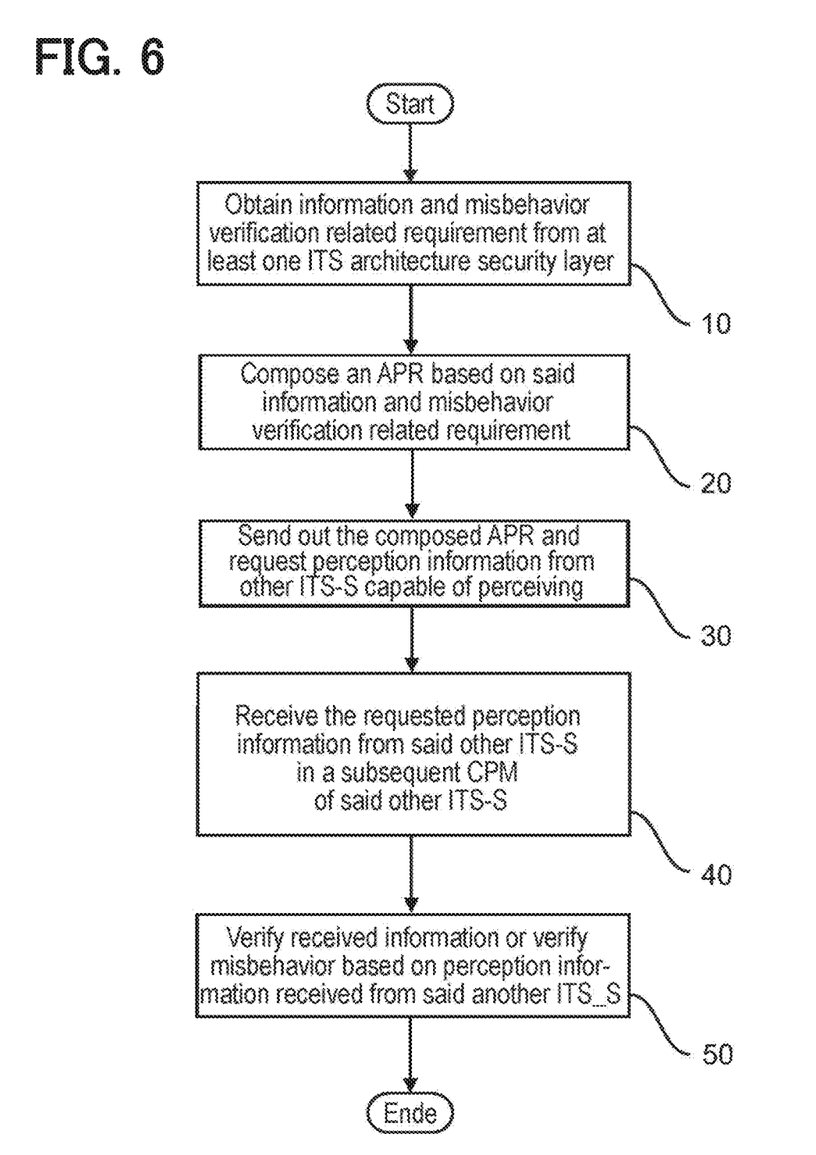
FIG. 6 shows an illustrative flow chart of a process according to the present disclosure.

FIG. 6 shows an illustrative flow chart of a concept of misbehavior detection, verification and/or reporting based on obtaining an information and misbehavior verification related requirement from at least one ITS architecture security layer according to the present disclosure in a process of exchanging of information in an intelligent transport system between a plurality of ITS-Ss, which generally includes composing, transmitting, receiving and/or decoding CPMs sent out periodically and containing information on one or more detected objects and/or FOVs and other characteristics of on-board sensors such as radar or camera(s), using the concept of CPM in which ITS-Ss can send their perceived objects and/or free-space to other ITS-Ss.

In a step 10, an ITS-S within which MRS and other security related functions are carried out in the security layer of the ITS architecture obtains an information and misbehavior verification related requirement from the security layer (or from at least one security layer where ITS architecture security services are provided on a layer-by-layer basis as mentioned above), such as, for example, when data received from an ITS-S are detected or determined to be suspicious in terms of possible misbehavior of this ITS-S or are suspected to be bad data for detected objects within a CPM.

In a step 20, an ITS-S composes an APR based on said information and misbehavior verification related requirement.

In a step 30, the APR composed based on said information and misbehavior verification related requirement is sent out from an ITS-S acting as a sender ITS-S, and perception information is requested from another ITS-S capable of perceiving with respect to said information and misbehavior verification related requirement, i.e. from another ITS-S that can better "see" the information requested in the APR and, thus, can return information based on which the suspicious information or data can be verified.

In a step 40, the requested perception information is received from said another ITS-S in a subsequent CPM of said another ITS-S.

In a step 50, then, the information sent by other ITS-Ss is verified, and/or the misbehavior, i.e. whether a misbehavior is present or not, is verified based on the perception information received from said another ITS_S.

According to an embodiment, at least the verification steps as described above may be performed within an additional, or separate, logical module (called "CPS_SEC" herein) which is configured to be allocated to or split between ITS architecture security and facility layers. According to an embodiment, the CPS_SEC module is designed to help, or support, other functional entities in different layers of the ITS stack, e.g. the MRS in the security layer, in verifying various pieces of information received from other ITS-Ss. According to an embodiment, this verification will be carried out by strategically sending out area perception requests (APRs) within outgoing CPMs. For example, an area where a sender ITS-S already has perception information can be used to verify the claims of another ITS-S who is "supposedly" able to perceive in this area. The verification can be used to assess the position claims by other ITS-Ss for an ITS_S's own sake or for objects detected by their sensors. Additionally, APRs can also be used to verify a previously detected misbehavior by another ITS-S. In this case, the verification may preferably be carried out by strategically sending out APRs in outgoing CPMs, triggered by CPS_SEC.

Practical examples of the embodiments herein include position verification for detected objects, wherein a host ITS-S sends out an APR for the geographic area around the claimed object position by a suspected remote ITS-S and confirms the position claim by receiving object information within this area from third party ITS-Ss (granted that there are some trusted third party ITS-Ss in a position to respond to that APR).

Another practical example of the embodiments herein is misbehavior verification, wherein a host ITS-S sends out an APR for an area strategically calculated to confirm the misbehavior in question. If a remote ITS-S is suspected of sending a false own position, this can be verified by sending an APR around the claimed position and comparing the received object data in response to the object data sent by the suspected node (granted that there are some trusted third party ITS-S in a position to respond to that APR). Likewise, if a remote ITS-S is suspected of sending false objects, this can be verified by sending an APR around at least one of the claimed object position(s) and comparing the received object data in response to the object data sent by the suspected node (granted that there are some trusted third party ITS-S in a position to respond to that APR).

In a still further example for misbehavior detection, the evaluation of information of received CPMs takes into account the number of received feedbacks, a trustworthiness level of the source of the information, as well as margins compensating for inaccuracies of detection. Verification results are preferably combined with information from a misbehavior detection sensor. If nevertheless the verification results are or remain inconclusive, i.e. undetermined with respect to the presence or absence of misbehavior, follow-up APRs are used at a later time, e.g. when new ITS-Ss have joined the area in question.

It is noted that in case of limited processing capacity and where CPMs received from other ITS-Ss include a collective perception message significance index (CPM-SI), the arrangement is preferably such that CPMs with a high CPM-SI are processed first.

The technical effect of APR and APR Containers resides in expanding the V2X shared messaging to using CPM or a dedicated APR message for crowdsourcing perception information for a specific area in a traffic environment. A further technical effect of employing APR and APR Containers resides in that APR allows for using the requests for significance assessment of own sensor detected objects/free-space. The concept of APR and APR Containers adds to current techniques and standards in that one or more CPM(s) are sent out if an APR for an area is present. It also adds to CPM generation rules in, with regard to perceived object inclusion management, that upon receiving APR(s) all objects within the requested area(s) are included in the next CPM to be sent out, with regard to free-space addendum container inclusion management, that upon receiving APR(s) from other ITS-Ss, all the free-space information within the requested area(s) is included in the next CPM to be sent out, and with regard to a new APR container inclusion management, that all the relevant APRs are included within the APR container and a limit for the number of APRs in CPM at one time is considered and/or introduced.

The present disclosure has been described using one preferred embodiment thereof. It is, however, understood that the present disclosure is not limited to the specifically described embodiment and can include and cover additional aspects, configurations and modifications without departing from the scope of the subject matter described and claimed. Such additional aspects, configurations and modifications may, for example, include a method, a computing program, and an equipment for composing, transmitting, receiving, and decoding an ITS message or part of an ITS message containing information on a geographical area which is only partially or not at all detected by the sensors of the sender ITS-S and/or a relevance of the above area for the sender ITS-S.

Such additional aspects, configurations and modifications may, for example, further include a method, a computing program, and an equipment for calculating the relevance of a geographical area based on upcoming driving tasks, such as driving straight ahead, driving into an intersection, changing lane, and/or the proximity to the perception blind-spot.

Still further aspects, configurations and modifications may, for example, relate to a method, a computing program, and an equipment for deciding to compose a CPM based on a received APR, and/or a method, a computing program, and an equipment for calculating a significance index (SI) for each object based on the number of APRs by other ITS-Ss of an area in which an object detected by a host ITS-S is located.

In general, embodiments of the disclosure may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of this disclosure may be implemented by computer software executable by a data processor of a system entity, such as in the processor entity, or by hardware, or by a combination of software and hardware. Further in this regard it should be noted that any blocks of logic flow shown in the figures may represent program steps, or interconnected logic circuits, blocks and functions, or a combination of program steps and logic circuits, blocks and functions. The software may be stored on physical media such as memory chips, or memory blocks implemented within the processor, magnetic media such as hard disk or floppy disks, and optical media such as for example DVD and the data variants thereof, CD.

Memory may be of any type suitable to the local technical environment and may be implemented using any suitable data storage technology, such as semiconductor-based memory devices, magnetic memory devices and systems, optical memory devices and systems, fixed memory and removable memory. Data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the disclosures may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Electronic Design Automation (EDA) programs and tools automatically route conductors and locate components on a semiconductor chip using well established rules of design as well as libraries of pre-stored design modules. Once the design for a semiconductor circuit has been completed, the resultant design, in a standardized electronic format may be transmitted to a semiconductor fabrication facility or "fab" for fabrication.

The description so far has provided by way of an exemplary and non-limiting example a full and informative description of the exemplary embodiment of this disclosure. However, various modifications and adaptations may become apparent to those skilled in the relevant art in view of the foregoing description, when read in conjunction with the accompanying drawings and the appended claims. It is understood that all such and similar modifications of the teachings of this disclosure will still fall within the scope of this disclosure as defined in the appended claims.

With the present disclosure as described above, a method for exchanging of information in an intelligent transport system between a plurality of intelligent transport system stations (ITS-Ss) in said intelligent transport system (ITS) uses a wireless communication channel. The exchanging of information comprises composing, transmitting, receiving and/or decoding at least part of ITS messages at and/or between said plurality of ITS-Ss, wherein each of said plurality of intelligent transport system stations (ITS-Ss) comprises at least one sensor arranged to perceive, for example in the form of objects and/or free-space, in at least one geographical area within said traffic environment, is arranged to act both as a sender ITS-S and a receiver ITS-S, and is arranged to use, as said ITS messages, collective perception messages (CPMs) containing at least information about the perception within a traffic environment. An ITS communications security architecture including at least one security layer is configured to provide security services to ITS station communications. The method comprises the steps of obtaining an information and misbehavior verification related requirement from the at least one security layer; composing an area perception request (APR) based thereon;

sending the composed APR; requesting perception information from another ITS-S capable of perceiving with respect to the requirement; receiving the requested perception information from said another ITS-S; and verifying information sent by other ITS-Ss or verifying misbehavior based on the received perception information.

The invention claimed is:

1. A method for exchanging of information in an intelligent transport system between a plurality of intelligent transport system stations (ITS-Ss) in said intelligent transport system (ITS) using a wireless communication channel, said exchanging of information comprising composing, transmitting, receiving and/or decoding at least part of ITS messages at and/or between said plurality of ITS-Ss, wherein each of said plurality of intelligent transport system stations (ITS-Ss) comprises at least one sensor arranged to perceive, for example in the form of objects and/or free-space, in at least one geographical area within said traffic environment, is arranged to act both as a sender ITS-S and a receiver ITS-S, and is arranged to use, as said ITS messages, collective perception messages (CPMs) containing at least information about the perception within a traffic environment, and wherein an ITS communications security architecture including at least one security layer as a horizontal security management entity in the ITS communication stack is configured to provide security services to ITS station communications, said method comprising the steps of:

obtaining an information and misbehavior verification related requirement from the at least one security layer;

composing an area perception request (APR) based on said information and misbehavior verification related requirement;

sending, from an ITS-S acting as a sender ITS-S, the APR composed based on said information and misbehavior verification related requirement, and requesting perception information from another ITS-S capable of perceiving with respect to said information and misbehavior verification related requirement;

receiving, from said another ITS-S, the requested perception information in a subsequent CPM of said another ITS-S; and verifying information sent by other ITS-Ss or verifying misbehavior based on the perception information received from said another ITS_S.

2. The method according to claim 1, wherein said information and misbehavior verification related requirement is a requirement directed to detect and/or verify an ITS-S sending false and/or outdated information, and/or an ITS-S falsifying its own position.

3. The method according to claim 1, wherein misbehavior detection and reporting is carried out in a misbehavior reporting system (MRS) carried out in the security layer of the ITS architecture.

4. The method according to claim 1, wherein the security layer is subdivided into at least four basic ITS architecture layers, wherein security services are provided on a layer-by-layer basis, and wherein each of the security services operates within one or several of said ITS architectural layers.

5. The method according to claim 1, wherein a security related logical module (CPS_SEC) is provided and allocated to or split between security and facility layers in a cooperative intelligent transport system (C-ITS), and wherein CPS_SEC is configured to request APRs and to use them to verify a previously detected misbehavior by another ITS-S.

6. The method according to claim 5, wherein CPS_SEC is configured to support other functional entities in different layers of the ITS stack in verifying various pieces of information received from other ITS-Ss, wherein verification is carried out by sending out APRs within outgoing CPMs and used to assess the position claims by other ITS-Ss for self or objects detected by their sensors.

7. The method according to claim 1, including a step of position verification for detected objects where a host ITS-S is configured to send out an APR for the geographic area around the object position claimed by a suspect remote ITS-S and to confirm the position claim by receiving object information within this area from trusted third party ITS-Ss being in a position to respond to that APR.

8. The method according to claim 1, including a step of misbehavior verification where a host ITS-S is configured to send out an APR for an area calculated to confirm a misbehavior in question, wherein if a remote ITS-S is suspected of sending a false own position, the suspected false own position is verified by sending an APR around the claimed position and comparing object data received in response from trusted third party ITS-Ss being in a position to respond to that APR to the object data sent by the suspected node, and/or if a remote ITS-S is suspected of sending one or more false objects, the one or more suspected false objects are verified by sending an APR around one of the claimed object position and comparing object data received in response from trusted third party ITS-Ss being in a position to respond to that APR to the object data sent by the suspected node.

9. The method according to claim 1, wherein evaluation of information of received CPMs takes into account the number of received feedbacks, a trustworthiness level of the source of the information, as well as margins compensating for inaccuracies of detection.

10. The method according to claim 1, wherein verification results are combined with a misbehavior detection sensor, and wherein follow-up APRs are used at a later time if the results are inconclusive.

11. An intelligent transport system for exchanging of information in an intelligent transport system between a plurality of intelligent transport system stations (ITS-Ss) in said intelligent transport system (ITS) using a wireless communication channel, said exchanging of information comprising composing, transmitting, receiving and/or decoding at least part of ITS messages at and/or between said plurality of ITS-Ss, wherein each of said plurality of intelligent transport system stations (ITS-Ss) comprises at least one sensor arranged to perceive, for example in the form of objects and/or free-space, in at least one geographical area within said traffic environment, is arranged to act both as a sender ITS-S and a receiver ITS-S, and is arranged to use, as said ITS messages, collective perception messages (CPMs) containing at least information about the perception within a traffic environment, and wherein an ITS communications security architecture including at least one security layer is configured to provide security services to ITS station communications, said intelligent transport system comprising:

an obtaining unit arranged to obtain an information and misbehavior verification related requirement from the at least one security layer;

a composing unit arranged to compose an area perception request (APR) based on said information and misbehavior verification related requirement;

a sending unit arranged to send, from an ITS-S acting as a sender ITS-S, the APR composed based on said information and misbehavior verification related requirement, and requesting perception information from another ITS-S capable of perceiving with respect to said information and misbehavior verification related requirement;

a receiving unit arranged to receive, from said another ITS-S, the requested perception information in a subsequent CPM of said another ITS-S; and a verifying unit arranged to verify information sent by other ITS-Ss or verifying misbehavior based on the perception information received from said another ITS_S.

12. A computer-implemented system for exchanging of information in an intelligent transport system between a plurality of intelligent transport system stations (ITS-Ss) in said intelligent transport system (ITS) using a wireless communication channel, said exchanging of information comprising composing, transmitting, receiving and/or decoding at least part of ITS messages at and/or between said plurality of ITS-Ss, wherein each of said plurality of intelligent transport system stations (ITS-Ss) comprises at least one sensor arranged to perceive, for example in the form of objects and/or free-space, in at least one geographical area within said traffic environment, is arranged to act both as a sender ITS-S and a receiver ITS-S, and is arranged to use, as said ITS messages, collective perception messages (CPMs) containing perception information within a traffic environment, and wherein an ITS communications security architecture including at least one security layer is configured to provide security services to ITS station communications, said computer-implemented system comprising a memory for storing instructions which, when carried out by a processor, cause the processor to perform the steps of:

obtaining an information and misbehavior verification related requirement from the at least one security layer;

composing an area perception request (APR) based on said information and misbehavior verification related requirement;

sending, from an ITS-S acting as a sender ITS-S, the APR composed based on said information and misbehavior verification related requirement, and requesting perception information from another ITS-S capable of perceiving with respect to said information and misbehavior verification related requirement;

receiving, from said another ITS-S, the requested perception information in a subsequent CPM of said another ITS-S; and verifying information sent by other ITS-Ss or verifying misbehavior based on the perception information received from said another ITS_S.

* * * * *